United States Patent
Paik

(10) Patent No.: US 6,370,279 B1
(45) Date of Patent: Apr. 9, 2002

(54) BLOCK-BASED IMAGE PROCESSING METHOD AND APPARATUS THEREFOR

(75) Inventor: Joon ki Paik, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/056,859

(22) Filed: Apr. 8, 1998

(30) Foreign Application Priority Data

Apr. 10, 1997 (KR) ............................................ 97-13210

(51) Int. Cl.⁷ .............................. G06K 9/40; G06T 5/00
(52) U.S. Cl. ........................ 382/268; 382/199; 382/261; 382/304; 375/240.29
(58) Field of Search ................................. 382/254, 275, 382/268, 263, 264, 250, 205, 266, 199, 304, 261; 358/434; 348/420; 375/240.29

(56) References Cited

U.S. PATENT DOCUMENTS

| | | | |
|---|---|---|---|
| 4,493,420 A | * 1/1985 | Dennis | 209/587 |
| 5,282,031 A | * 1/1994 | Kim | 358/133 |
| 5,367,385 A | * 11/1994 | Yuan | 358/465 |
| 5,384,849 A | * 1/1995 | Jeong | 348/845.1 |
| 5,512,956 A | * 4/1996 | Yan | 348/606 |
| 5,757,972 A | * 5/1998 | Murayama | 382/242 |
| 5,905,579 A | * 5/1999 | Katayama et al. | 358/296 |
| 5,937,101 A | * 8/1999 | Jeon et al. | 382/268 |
| 5,995,656 A | * 11/1999 | Kim | 382/169 |

FOREIGN PATENT DOCUMENTS

| | | | |
|---|---|---|---|
| EP | 0 526 885 A2 | 2/1993 | |
| EP | 0 559 982 A2 | 9/1993 | |
| EP | 0 666 695 | 8/1995 | H04N/7/26 |
| EP | 0 666 695 A2 | 8/1995 | |
| EP | 0 723 375 | 7/1996 | H04N/7/30 |
| JP | 60-65637 | 4/1985 | |
| JP | 61-121589 | 6/1986 | |
| JP | 62-214788 | 9/1987 | |
| JP | 2-134910 | 5/1990 | |
| JP | 4-140975 | 5/1992 | |
| JP | 4-188283 | 7/1992 | |
| JP | 4-277982 | 10/1992 | |
| JP | 5-22709 | 1/1993 | |
| JP | 5-143726 | 6/1993 | |
| JP | 5-292484 | 11/1993 | 348/420 |
| JP | 7-170512 | 7/1995 | |
| JP | 7-274170 | 10/1995 | |
| JP | HEI 8-46966 | 2/1996 | |
| JP | HEI 8-274966 | 10/1996 | |
| JP | 10-99701 | 10/1998 | |

OTHER PUBLICATIONS

"Use of A Class of Two–Dimensional Functions for Blocking Artifacts Reduction in Image Coding", by Jechang Jeong et al, pp. 478–481.

(List continued on next page.)

*Primary Examiner*—Scott Rogers
(74) *Attorney, Agent, or Firm*—Sughrue Mion, PLLC

(57) ABSTRACT

A block-based image processing method and an apparatus therefor, in which blocking artifacts caused by a block-based image processing can be removed by using spatial adaptive filtering based on image restoration theory. The block-based image processing method, for removing blocking artifacts induced in processing an image in blocks of a predetermined unit size, includes the steps of: (a) dividing the processed image signal into blocks of the predetermined unit size; (b) detecting an edge direction of the image for each block divided; (c) band-pass filtering the processed image signal to obtain plurality of filtered image signals equal in number to the possible types of edge direction; (d) selecting one of the band-pass filtered image signals for each block, according to the detected edge direction; and (e) synthesizing the selected image signals for all the blocks to obtain an original signal from which the blocking artifact is removed.

11 Claims, 6 Drawing Sheets

OTHER PUBLICATIONS

"Nonlinear Space–Variant PostProcessing of Block Coded Images", by Bhaskar Ramamurthi et al, IEEE Transactions on Acoustics, Speech, and Signal Processing, vol. ASSP–34, No. 5, Oct. 1986, pp. 1258–1267.

Regularized Reconstruction to Reduce Blocking Artifacts of Block Discrete Cosine Transform Compressed Images, Yongyi Yang et al, IEEE Transactions on Circuits and Systems for Video Technology, vol. 3, No. 6, Dec. 1993, pp. 421–432.

IEEE Transactions on Circuits and Systems for Video Technology, vol. 2, No. 1 Mar. 1992, pp. 91–95.

IEEE Transactions on Circuits and Systems for Video Technology, vol. 3, No. 6, Dec. 1993, pp. 439–440.

"Projection–Based Spatially Adaptive Reconstruction of Block–Transform Compressed Images", by Yongyi Yang et al, IEEE Transactions on Image Processing, vol. 4, No. 7, Jul. 1995, pp. 896–908.

"An Optimization Approach for Removing Blocking Effects in Transform Coding", by Shigenobu Minami et al, IEEE Transactions on Circuits and Systems for Video Technology, vol. 5, No. 2, Apr. 1995, pp. 74–82.

"Iterative Image Restoration Algorithms", by Joon ki Paik, Optical Engineering, vol. 28, No. 7, Jul. 1989, pp. 735–748.

* cited by examiner

FIG. 7

| | | | | | | | |
|---|---|---|---|---|---|---|---|
| 50 | 60 | 70 | 80 | 90 | 120 | 255 | 255 |
| 60 | 60 | 70 | 96 | 130 | 255 | 255 | 255 |
| 70 | 70 | 80 | 120 | 145 | 255 | 255 | 255 |
| 70 | 96 | 120 | 145 | 255 | 255 | 255 | 255 |
| 90 | 130 | 200 | 255 | 255 | 255 | 255 | 255 |
| 255 | 255 | 200 | 255 | 255 | 255 | 255 | 255 |
| 255 | 255 | 200 | 255 | 255 | 255 | 255 | 255 |

BLOCK-BASED IMAGE PROCESSING METHOD AND APPARATUS THEREFOR

BACKGROUND OF THE INVENTION

1. Field of the Invention

The present invention relates to an image processing system, and more particularly, to a method of processing an image based on block units, and an apparatus therefor.

2. Description of the Related Art

In an image processing system for compressing or filtering an image, the entire image is divided into a plurality of sub-images, and the image processing is performed within each sub-image. Such image processing is called a block-based image process. The block-based image process can reduce the computation amount required to process an image, and can allow effective hardware configurations, and so has been widely used.

However, the block-based image process causes blocking artifacts due to discontinuity at the boundaries of the blocks, which have been separately processed, thereby deteriorating image quality.

For example, such blocking artifacts are generated in compressing an image with block-based discrete cosine transform used for coding still images and moving images in a digital high definition television (HDTV), the Joint Photographic Expert Group (JPEG) method and Moving Picture Expert Group (MPEG) method.

In order to remove the above blocking artifacts, the following methods have been suggested.

First, a method of removing blocking artifacts by low-pass filtering the brightness values of pixels existing at the boundaries of blocks is disclosed in article entitled "Non-linear space-variant postprocessing of block coded images", *IEEE Transactions on Acoust., Speech and Signal Processing*, Vol. 34, No. 5, pp. 1258–1267, October 1986, by B. Ramamurthi and A. Gersho. However, by this method, actually the brightness values of the pixels adjacent to the boundaries of blocks are low-pass filtered as well as those of the pixels belonging to the boundaries, thereby blurring the image.

Second, there is a method of iteratively reducing spatially adaptive blocking artifacts based on regularization theory, which is disclosed in an article entitled "Regularized reconstruction to reduce blocking artifacts of block discrete cosine transform compressed images", *IEEE Trans. on Circuits and Syst. for Video Technolo.* Vol. 3, No. 6, pp. 421–432, December 1993, by Y. Y. Yang, N. P. Galatsanos and A. K. Katsaggelos.

Third, a method of reducing blocking artifacts by iteratively projecting an image onto convex sets satisfying constraints that a negative brightness value of pixel is not allowed and the boundary is continuous has been suggested in articles by R. Rosenholtz and A. Zakhor ("Iterative procedures for reduction of blocking effects in transform image coding", *IEEE Trans. on Circuits and Syst. for Video Technol*, Vol. 2, No. 1, pp. 91–94, March 1992), S. J. Reeves and S. L. Eddins (Comments on "iterative procedures for reduction of blocking effects in transform image coding", *IEEE Trans. on Circuit and Syst. for Video Technol.*, Vol. 3, No. 6, pp. 439–440, December 1993), and Y. Y. Yang, N. P. Galatsanos and A. K. Katsaggelos ("Projection-based spatially adaptive reconstruction of block-transform compressed images", *IEEE Trans. on Image Processing*, Vol. 4, No. 7, pp. 896–908, July 1995).

Fourth, a method of removing blocking effects by changing discrete cosine transform (DCT) coefficients by minimizing a predetermined cost function has been suggested by S. Minami and A. Zakhor ("An optimization approach for removing blocking effects in transform coding", *IEEE Trans. on Circuits and Syst. for Video Technol.*, Vol. 5, No. 2, pp. 74–82, April 1995) and J. Jeong and B. Jeon ("Use of a class of two-dimensional functions for blocking artifacts reduction in image coding", *Proceedings. 1996 International Conference on Image Processing*, pp. 478–481, 1995).

However, when blocking artifacts are caused by a compression and reproduction process, then the inverse process, for removing the blocking artifacts, has no intrinsic solution, thus the iterative image restoration method such as the second and third conventional methods, or the constrained optimization method such as the forth conventional method, have been used. Here, having the intrinsic solution in the inverse process means that the original image before the block-based image process is obtained by the inverse process of the block-based image process. However, it takes much time to obtain a solution which approximates the intrinsic solution, using the above second and third iterative methods. Thus, application of such methods is restricted to non-real time processes such as JPEG coding. Also, the second, third and fourth methods process even still images slowly, thereby causing restrictions in use.

A moving image compression system for compressing a moving image using the moving image compression standard, such as H.261, H.263, MPEG1, MPEG2 and MPEG4, has relatively many application fields in comparison with still image compression system. Thus, a method of processing the blocking effects of a moving image in real time is required. The moving image compression system causes the blocking effects if a bit rate is less than a predetermined threshold value. Such blocking effects occur at a rapid image changes, thereby further deteriorating the image.

In addition, as a method of expanding contrast of an image, there is a non-overlapping histogram equalization method in which the entire image is divided into uniform blocks which do not overlap each other, and then the histogram equalization is separately performed within the divided block. However, because each block is separately processed, the adjacent blocks show discontinuities, causing the blocking artifacts.

SUMMARY OF THE INVENTION

It is an objective of the present invention to provide a block-based image processing method capable of removing blocking artifacts, caused by another block-based image process, by using spatial adaptive filtering based on an image restoration theory.

It is another objective of the present invention to provide a block-based image processing apparatus for the block-based image processing method.

To achieve the first objective, there is provided a block-based image processing method for removing blocking artifacts induced in processing an image in blocks of a predetermined unit size, the method comprising the steps of: (a) dividing the processed image signal into blocks of the predetermined unit size; (b) detecting an edge direction of the image for each block divided; (c) band-pass filtering the processed image signal to obtain plurality of filtered image signals equal in number to the possible types of edge direction; (d) selecting one of the band-pass filtered image signals for each block, according to the detected edge direction; and (e) synthesizing the selected image signals for all the blocks to obtain an original signal from which the blocking artifact is removed.

To achieve the second objective, there is provided a block-based image processing apparatus for removing blocking artifacts induced by processing an image in blocks of a predetermined unit size, comprising: an edge direction detecting portion for detecting an edge direction of the processed image signal for each block; first through S-th band pass filters for filtering the processed image signal at S different predetermined bands and outputting the filtered results, wherein S is equal to the number of edge directions; a signal selector for selecting at least one of outputs of the first through S-th band pass filters in response to the detected edge direction; and a signal synthesizer for synthesizing the selected image signals for all blocks, output from the signal selector, and outputting the synthesized signal as an original image signal from which the blocking artifacts are removed.

BRIEF DESCRIPTION OF THE DRAWINGS

The above objectives and advantages of the present invention will become more apparent by describing in detail a preferred embodiment thereof with reference to the attached drawings in which:

FIG. 7 is a diagram showing an example of a quantization table used in JPEG standard.

DESCRIPTION OF THE PREFERRED EMBODIMENT

Figure 1:
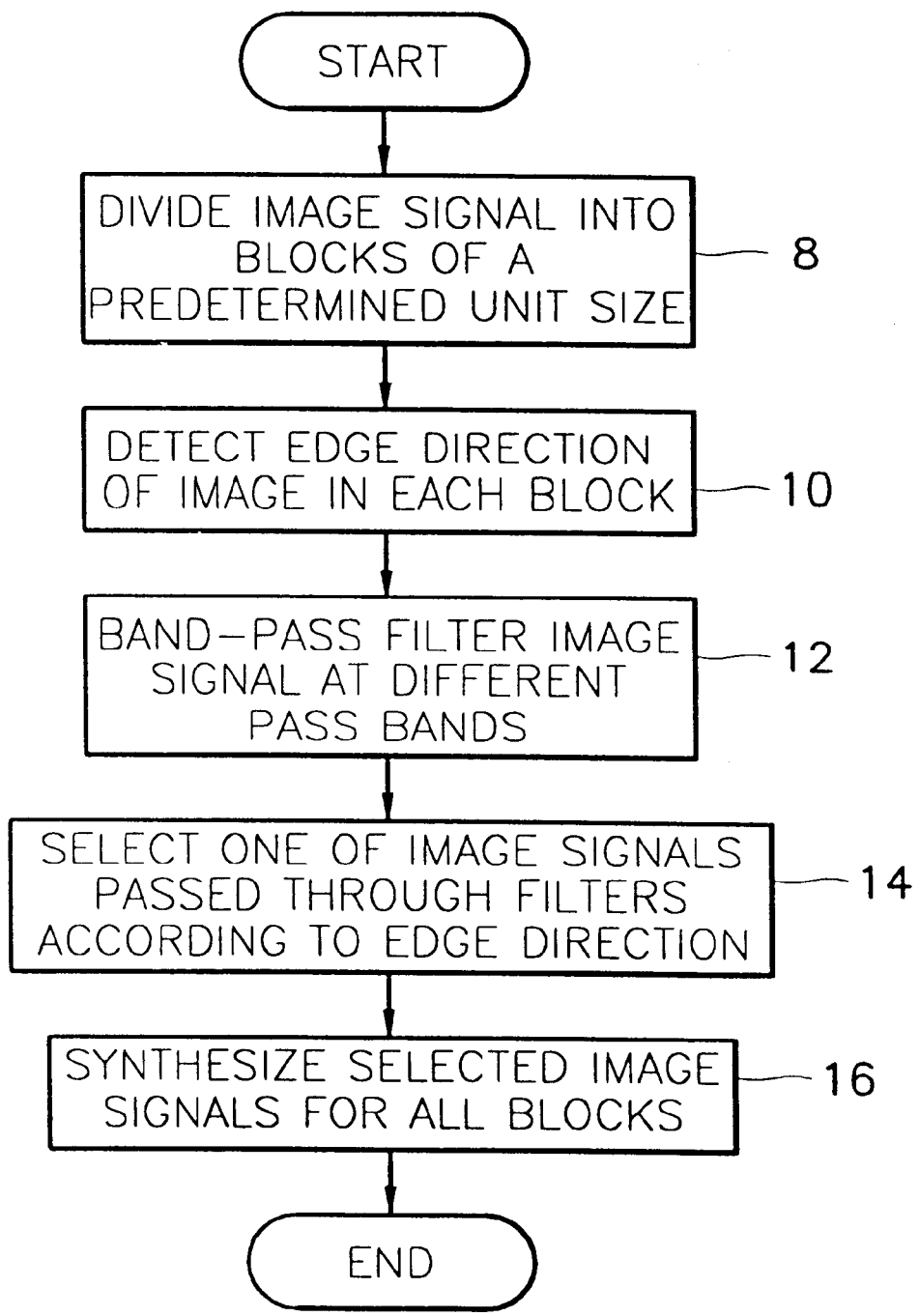
FIG. 1 is a flowchart representing image restoration by a block-based image processing method according to the present invention.

As shown in FIG. 1, in image restoration by a block-based image processing method according to the present invention, first, the entire image, which has undergone a previous block-based process, is divided into blocks of a predetermined unit size (step 8). That is, the entire image is divided into sub-images having the same size as the blocks for the previous block-based image process. Then, an edge direction of the image in each divided block is detected (step 10). The edge direction of the image can be detected by various methods. According to a representative method, the edge direction of the image is detected using two or more discrete cosine transform (DCT) coefficients on each block. Here, the discrete cosine transform is a kind of transform method for analyzing a signal using a cosine function of various frequencies as a basis function. Assuming that each block on which the edge direction is to be detected is formed of B×B pixels, the DCT coefficients are expressed by the following formula (1).

$$C_x(k_1, k_2) = a(k_1) \cdot a(k_2) \left[ \sum_{n_1=0}^{B-1} \sum_{n_2=0}^{B-1} x(n_1, n_2) \cos\frac{\pi}{2B}k_1(2n_1+1) \cos\frac{\pi}{2B}k_2(2n_2+1) \right] \quad (1)$$

where $C_x(k_1,k_2)$ represents a DCT coefficient, and B represents column or row size of the DCT block. a(u) is $$\frac{1}{\sqrt{B}}$$

for u=0 and $$\frac{\sqrt{2}}{\sqrt{B}}$$

for u=1,2, ..., B-1. Here, the DCT coefficients obtained by performing the DCT for each block are compared with first and second predetermined threshold values $T_1$, and $T_2$, thereby detecting the edge direction of the image within each block. Here, $T_1$ and $T_2$ can be arbitrarily adjusted by a user. By adjusting the sizes of the $T_1$ and $T_2$, the direction of the edge can be precisely detected. The first threshold value $T_1$ is used for determining whether or not the direction of the edge exists, and the second threshold value $T_2$ is used for determining whether or not the direction of the edge is 45° or 135°.

In consideration of the empirical results of the threshold values $T_1$ and $T_2$, it is preferable that the threshold values $T_1$ and $T_2$ are the same as each other. Also, as the threshold value $T_1$ or $T_2$ is smaller, the edge direction can be more precisely detected. In an image processing system using the JPEG, MPEG1, MPEG2 or MPEG4 standard, the threshold value $T_1$ or $T_2$ is preferably slightly smaller than the corresponding quantization coefficient in a quantization table. However, in an image processing system which does not use a quantization table, if the number of possible brightness values of each pixel is $2^8$, it is preferable that the threshold value $T_1$ or $T_2$ is the value between 40 and 50. If the number of possible brightness values of each pixel is $2^9$, it is preferable that the threshold value $T_1$ or $T_2$ is the value between 80 and 100.

Figure 2:
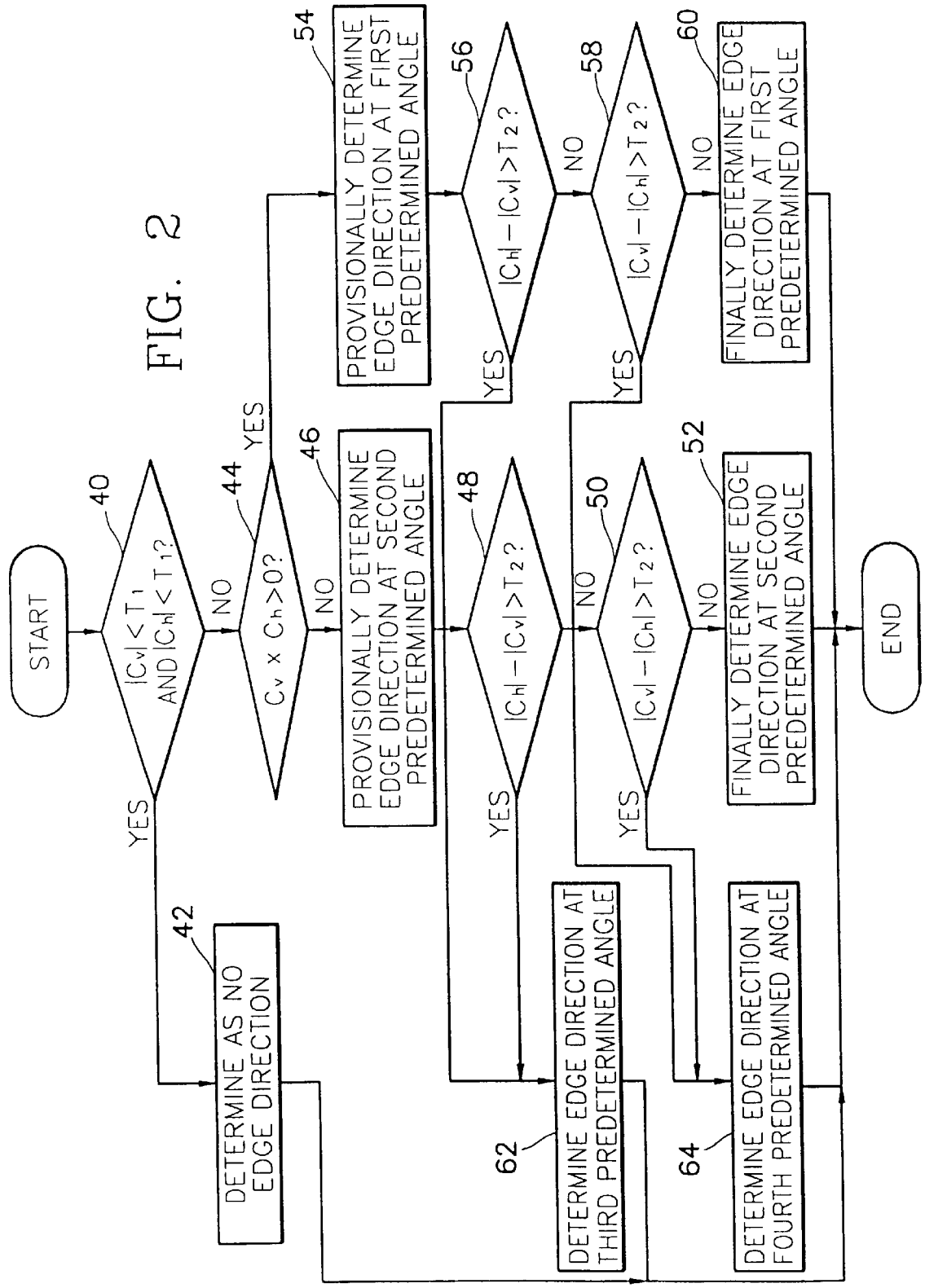
FIG. 2 is a flowchart illustrating in detail the step 10 of FIG. 1.
Figure 3:
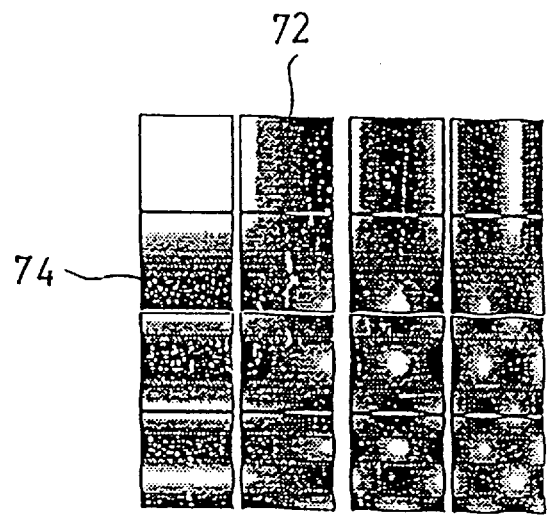
FIG. 3 is a schematic view of 16 types of basis functions used for a 4×4 discrete cosine transform.

FIG. 2 is a flowchart illustrating in detail the step 10 of FIG. 1 according to an embodiment of the present invention, and FIG. 3 is a schematic view of 16 basis functions used for a 4×4 DCT.

Assuming that the size of a DCT block is 4×4, 16 basis functions are generated as shown in FIG. 3 and 16 DCT coefficients corresponding to each basis function are generated. In the embodiment of FIG. 2, the edge direction is determined by using two DCT coefficients $C_h$ and $C_v$ expressed by the following formula (2) among the 16 DCT coefficients. Here, reference numeral 72 is a DCT coefficient $C_h$ representing the edge in the horizontal direction, and reference numeral 74 is a DCT coefficient $C_v$ representing the edge in the vertical direction.

$$C_v = C(0,1) = \sum_{n_1=0}^{3} \sum_{n_2=0}^{3} \frac{\sqrt{2}}{4} x(n_1, n_2) \cos\frac{\pi}{2 \cdot 4}(2n_2+1) \quad (2)$$

$$C_h = C(1, 0) = \sum_{n_1=0}^{3} \sum_{n_2=0}^{3} \frac{\sqrt{2}}{4} x(n_1, n_2) \cos \frac{\pi}{2 \cdot 4}(2n_1 + 1)$$

Figure 4A:
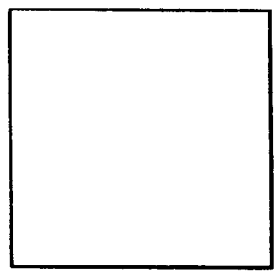
FIGS. 4A through 4E are diagrams illustrating examples of edge directions of an image in each block.
Figure 4B:
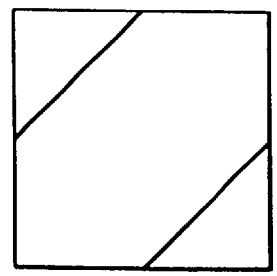
Figure 4C:
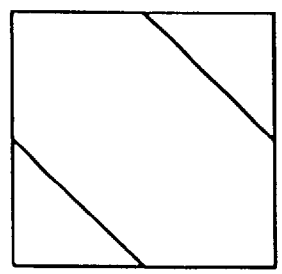
Figure 4D:
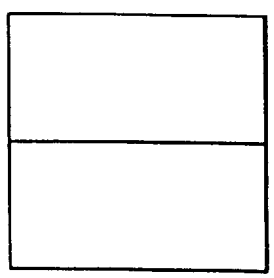
Figure 4E:
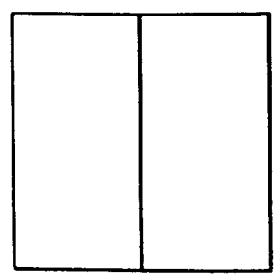

FIGS. 4A through 4E show examples of the determined edge directions. In detail, FIG. 4A shows an example without edge direction, FIG. 4B shows an example where the edge direction is 45°, FIG. 4C shows an example where the edge direction is 135°, and FIG. 4D shows an example where the edge direction is 180°, that is, horizontal, and FIG. 4E shows an example where the edge direction is 90°, that is, vertical.

Referring to FIGS. 2 and 4A through 4E, the step 10 of FIG. 1 will be described in detail.

First, in order to detect the edge direction of the image for an arbitrary block, a determination is made of whether or not $|C_v|<T_1$ and $|C_h|<T_1$ (step 40). If $|C_v|<T_1$ and $|C_h|<T_1$, it is determined that the image of the corresponding block has no edge direction, as shown in FIG. 4A (step 42). However, if $|C_v| \geq T_1$ or $|C_h| \geq T_1$, a determination is made of whether or not $C_v \times C_h > 0$ (step 44). If $C_v \times CCC_h > 0$, the edge direction of the image for the corresponding block is provisionally determined to be a first predetermined angle, e.g., 45° as shown in FIG. 4B (step 54). However, if $C_v \times C_h \leq 0$, the edge direction of the image for the corresponding block is provisionally determined to be a second predetermined angle, e.g., 135° as shown in FIG. 4C (step 46). After the step 46 or the step 54, it is determined whether or not $|C_h|-|C_v|>T_2$ (step 48 or step 56). If $|C_h|-|C_v|>T_2$, the edge direction of the image for the corresponding block is provisionally determined to be horizontal, as a third predetermined angle, e.g., 180° as shown in FIG. 4D (step 62). However, if $|C_h|-|C_v| \leq T_2$, a determination of whether or not $|C_v|-|C_h|>T_2$ is made (step 50 or 58). If $|C_v|-|C_h|>T_2$, the edge direction of the image for the corresponding block is provisionally determined to be vertical, as a fourth predetermined angle, e.g., 90° as shown in FIG. 4E (step 64). However, if it is determined in the step 50 that $|C_v|-|C_h| \leq T_2$, the edge direction of the image for the corresponding block is finally determined to be the second predetermined angle, e.g., 135° as shown in FIG. 4C (step 52). Also, if it is determined in the step 58 that $|C_v|-|C_h| \leq T_2$, the edge direction of the image for the corresponding block is finally determined to be the first predetermined angle, e.g., 45°, as shown in FIG. 4B (step 60).

After the step 10 of FIG. 1, if the number of types of edge direction is equal to S, then the block-based processed signal is band-pass filtered at S different specific bands (step 12). That is, the number (S) of edge directions is the same as the number (S) of different specific bands for filtering.

Also, because the step 12 takes much more time than the step 10, the step 10 and step 12 may be simultaneously performed, even though not shown in FIG. 1.

After the step 12, one of S band-pass filtered image signals is selected according to the edge directions detected in the step 10, and the selected signal is output according to horizontal and vertical synchronous signals described below (step 14). After the steps 10 through 14 are performed on all blocks, the image signals for all the blocks, selected in the step 14, are synthesized, thereby restoring the original image from which the blocking artifacts are removed (step 16).

Hereinafter, the structure and operation of a block-based image processing apparatus according to a preferred embodiment of the present invention will be described with reference to the appended drawings.

Figure 5:
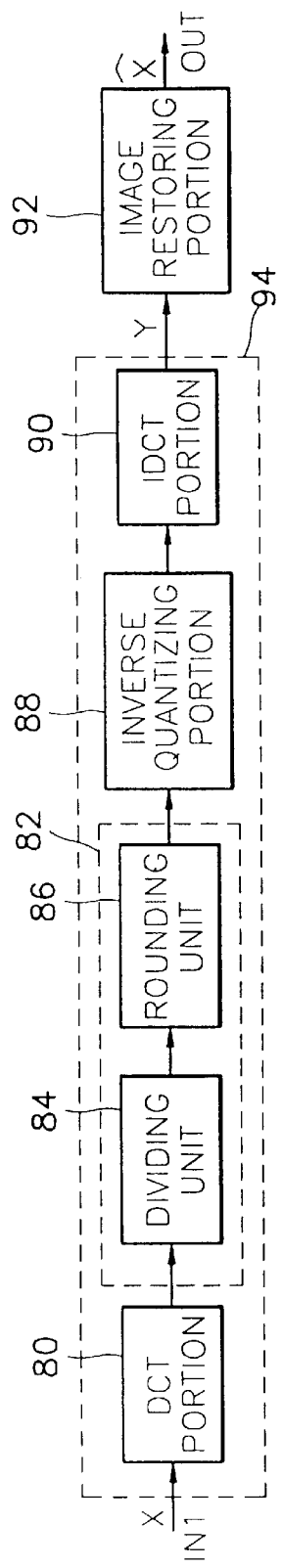
FIG. 5 is a block diagram of a conventional block-based image processing apparatus.

FIG. 5 is a block diagram of a conventional block-based image processing apparatus. The conventional block-based image processing apparatus includes a DCT portion 80, a quantizing portion 82 having a dividing unit 84 and a rounding unit 86, an inverse quantizing portion 88, an inverse DCT (IDCT) portion 90 and an image restoring portion 92.

Figure 6:
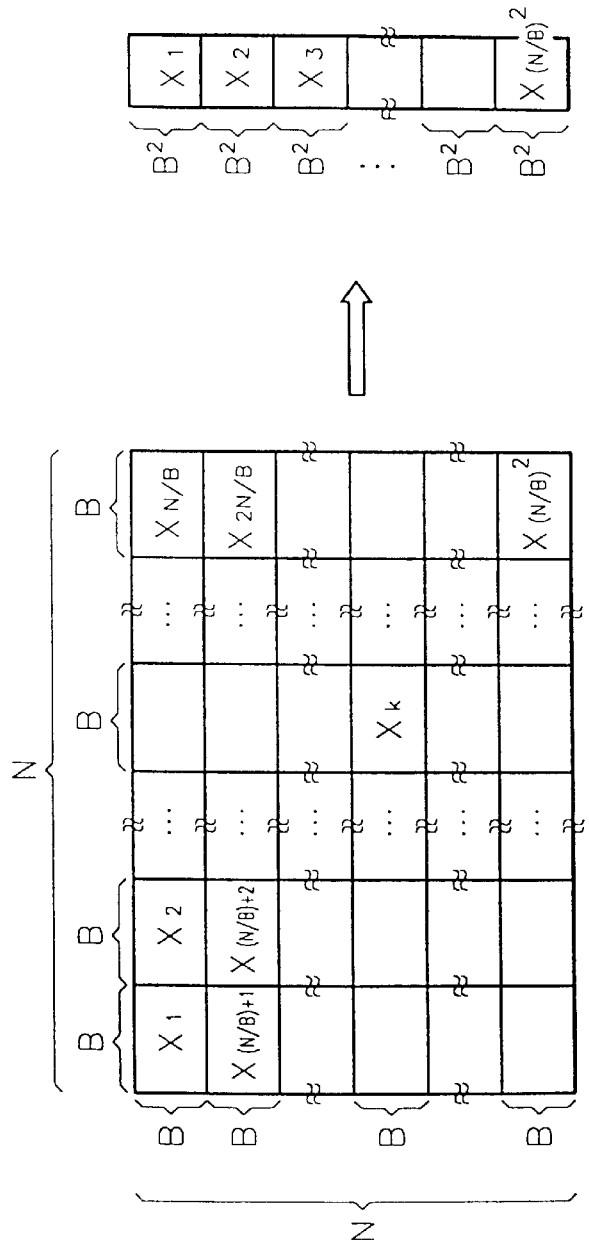
FIG. 6 shows a one-dimensional array used for processing an N×N image in B×B block units.

FIG. 6 shows a one-dimensional array used for processing an N×N image in B×B block units.

In FIG. 5, an encoding portion, including the DCT portion 80, dividing unit 84 and rounding unit 86, receives an N×N image X(m,n) via an input port IN1, and compresses the input image based on the B×B block unit. Also, a decoding portion, including the inverse quantizing portion 88 and the IDCT portion 90, reproduces the compressed signals input from the encoding portion.

That is, the DCT portion 80 of the encoding portion receives a two-dimensional image signal expressed by a one-dimensional vector shown in the formula (3) via the input port IN1 and performs the DCT on the input signal.

$$X=[X_1, X_2, \ldots, X_K, \ldots, X_{N^2/B^2}] \tag{3}$$

where $X_k$ represents a $B^2 \times 1$ raster-scanning ordered one-dimensional vector for the B×B DCT block as shown in FIG. 6. Here, k=(p−1)(N/B)+q, wherein p represents a row number and q represents a column number. Also, for convenience of explanation, N is assumed to be a multiple of B.

Here, a transfer function (C) of the DCT portion 80 is expressed as a matrix by the formula (4).

$$C = \begin{bmatrix} [C] & 0 & \cdots & 0 \\ 0 & [C] & \cdots & 0 \\ \vdots & & & \vdots \\ 0 & 0 & \cdots & [C] \end{bmatrix} \tag{4}$$

where [C] represents a $B^2 \times B^2$ forward DCT matrix used for each B×B block in the raster-scanning ordered image.

FIG. 7 shows an example of a quantization table used in the JPEG standard.

Also, the dividing unit 84 of the quantizing portion 82 receives the signal output from the DCT portion 80, and divides the input signal into the corresponding quantization coefficients, e.g., 50, 60, 70, 80, 90, 96, 120, 130, 145, 200 or 255 from the quantization table of FIG. 7. The rounding unit 86 rounds the result of the division. Here, a transfer function Q of the quantizing portion 82 is expressed by the formula (5), as a multiplication of the transfer functions D and R of the dividing unit 84 and the rounding unit 86.

$$Q=RD \tag{5}$$

where the transfer function D of the dividing unit 84 is expressed by the formula (6).

$$D = \begin{bmatrix} [d_1] & 0 & \cdots & 0 \\ 0 & [d_2] & \cdots & 0 \\ \vdots & & & \vdots \\ 0 & 0 & \cdots & \left[d_{\frac{N^2}{B^2}}\right] \end{bmatrix} \tag{6}$$

The matrix of the formula (6) is a block diagonal matrix, and each sub-matrix $[d_k]$ is also a diagonal matrix. Here, each diagonal element of $d_k$ is determined by the following method. That is, assuming that the quantization is performed based on the JPEG quantization table, for example, shown in FIG. 7, the diagonal element of the sub-matrix $[d_k]$ is expressed by the formula (7).

$$d_k(l, l) = \frac{1}{t(i, j)}, \text{ for } l = (i-1) \cdot 8 + j, 1 \leq i, j \leq 8 \quad (7)$$

where t(i,j) means the quantization coefficient value at column I and row j in the quantization table shown in FIG. 7.

In the formula (5), the rounding by the rounding unit 86 having a transfer function expressed by a matrix R requires a many-to-one operation, which is non-linear and has an inverse undefined in all portions for compression and reproduction included in an image compressing/reproducing portion 94 in FIG. 5. Thus, this operation can be expressed as a diagonal matrix performing a rounding operation on the element corresponding to an input vector.

The inverse quantizing portion 88, having as a transfer function the inverse matrix $D^{-1}$ of the transfer function D of the dividing unit 84, performs inverse quantization on the quantized signal input from the quantizing portion 82. The IDCT portion 90 has a transfer function $C^{-1}$ expressed by the matrix of the formula (8), and receives the output of the inverse quantizing portion 88 and performs the IDCT on the output of the inverse quantizing portion 88.

$$C^{-1} = \begin{bmatrix} [C]^{-1} & 0 & \ldots & 0 \\ 0 & [C]^{-1} & \ldots & 0 \\ \vdots & & & \vdots \\ 0 & 0 & \ldots & [C]^{-1} \end{bmatrix} \quad (8)$$

where $[C]^{-1}$ represents a $B^2 \times B^2$ inverse DCT matrix used for each B×B block in the raster-scanning ordered image.

In conclusion, the image compressing/reproducing unit 94 of the block-based image processing apparatus of FIG. 5 has a relation equation expressed by the formula (9).

$$Y = C^{-1} D^{-1} Q C X \quad (9)$$

where X represents an image signal input via the input port IN1 as shown in FIG. 5, and Y represents a signal output to the image restoring portion 92 after the block-based image processing, respectively. Here, the size of each matrix $C^{-1}$, $D^{-1}$, Q or C is $N^2 \times N^2$.

In order to simplify the formula (9), assuming that $C^{-1}D^{-1}QC$ is H, generally H can be regarded as a non-linear and spatial adaptive degradation operator. To remove the blocking artifacts by the degradation operator H, the present invention removes the blocking artifacts by using the method above described with reference to FIG. 1, instead of using the convention iterative image restoration method or constrained optimization method. The image restoring portion 92 of FIG. 5, performing the method of FIG. 1, receives a block-based processed image Y to remove the blocking effects as follows.

Figure 8:
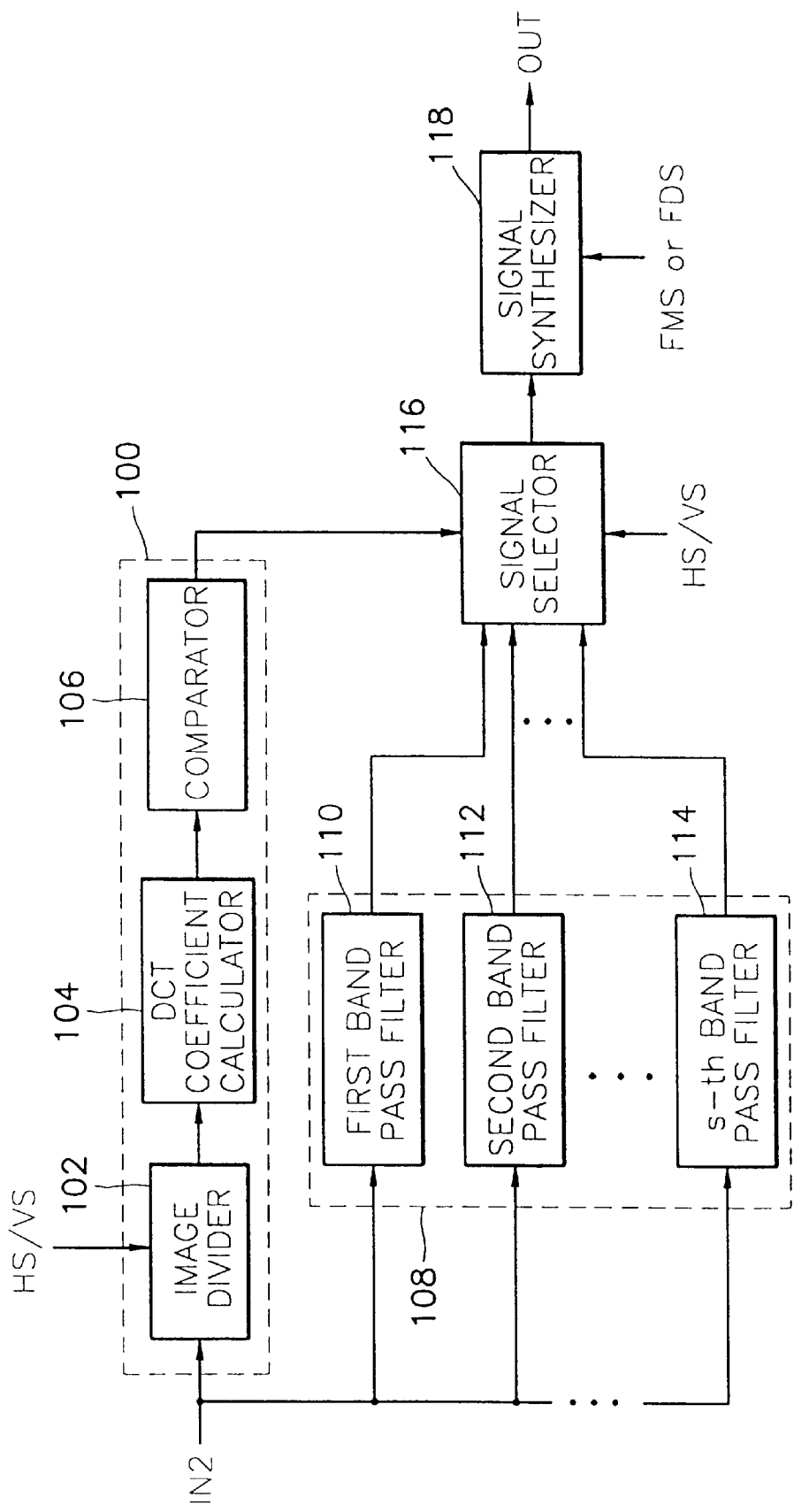
FIG. 8 is a block diagram showing the image restoring portion of FIG. 5 according to an embodiment of the present invention.

FIG. 8 is a block diagram of the image restoring portion 92 shown in FIG. 5 according to an embodiment of the present invention. The image restoring portion 92 includes an edge direction detecting portion 100 having an image divider 102, a DCT coefficient calculator 104 and a comparator 106; a filtering portion 108 having a first band pass filter 110, a second band pass filter 112, . . . , and an S-th band pass filter 114; a signal selector 116; and a signal synthesizer 118.

The edge direction detecting portion 100 of FIG. 8 receives the output Y of the image compressing/reproducing portion 94 of FIG. 5 or an arbitrary image signal which is block-based processed having the blocking effects, from an arbitrary system (not shown) via an input port IN2, and divides the input image signal into blocks of a predetermined unit size. Then, the detecting portion 100 obtains two or more DCT coefficients for each divided block, and compares the obtained DCT coefficients with predetermined threshold values $T_1$ and $T_2$, thereby detecting the edge direction of the image in each block. That is, the edge direction detecting portion 100 performs the step 8 and step 10 shown in FIG. 1.

To this end, the image divider 102 of the edge direction detecting portion 100 receives the image signal, processed by blocks, via the input port IN2, to divide the input image signal into blocks of a predetermined unit size. That is, the image divider 102 groups the brightness values of the pixels input via the input port IN2 into the predetermined unit blocks in response to a horizontal or vertical synchronous signal HS/VS. The DCT coefficient calculator 104 calculates two or more DCT coefficients for each block output from the image divider 102, and outputs the calculated coefficients. The comparator 106 compares the two or more DCT coefficients with the predetermined threshold values $T_1$ and $T_2$. Then, the edge direction of the image of each block is detected according to the result of the comparison. That is, the step 10 described in detail with reference to FIG. 2 is performed by the comparator 106.

The edge direction detecting portion 100 of the present invention is not limited to the structure as shown in FIG. 8, and may include different structures to detect the edge direction according to the method shown in FIG. 2.

In FIG. 8, the first through S-th band pass filters 100 through 114 (S is the same as the number of edge directions), each having a different pass band, receive the block-based processed image signal via the input port IN2, and filter the components in their respective pass bands, thereby outputting the filtered components of the image signal to the signal selector 116. Here, each band pass filter is a constrained least squares (CLS) image restoration filter adopting a high pass filter having a transfer function $A_E$. The CLS image restoration filter is described in a book entitled "Fundamentals of digital image processing" by A. K. Jain, *Prentice-Hall*, pp. 297, 1989. Alternatively, each band pass filter shown in FIG. 8 can be implemented by a finite impulse response (FIR) filter having a transfer function $g_E(k,j)$ expressed by the following formula (10).

$$g_E(k, l) = \frac{H_L^*(k, l)}{|H_L(k, l)|^2 + \lambda_E |A_E(k, l)|^2} \quad (10)$$

Here, E has the values from 0 to 4 when the number (S) of edge directions is equal to 5, and represents the types of the classified image edges, $H_L(k,l)$ is a transfer function of a spatially invariant low pass filter, $H_L^*(k,l)$ represents the complex conjugate of $H_L(k,l)$, and $\lambda_E$ represents a constant.

Here, the transfer function $H_L$ of the low pass filter may be expressed by, for example, the formula (11), as a block circulant matrix.

$$h_L(m, n) = \frac{1}{22}\begin{bmatrix} 1 & 2 & 1 \\ 2 & 10 & 2 \\ 1 & 2 & 1 \end{bmatrix} \quad (11)$$

The transfer function $H_L$ may be an approximate value of the transfer function of the low pass filter, based on the fact that the higher the frequency component of the DCT coefficient, the more coarse the quantization. That is, as the quantization is coarser, probability that the coefficient value goes to 0 increases, so that the transfer function H can approximate the transfer function $H_L$.

Also, a transfer function $A_E$ of a high pass filter can be expressed into as one of 5 types expressed by the formula (12), and selectively smooths the block boundaries while maintaining the directional edge.

$$\begin{bmatrix} -1 & -1 & -1 \\ -1 & 8 & -1 \\ -1 & -1 & -1 \end{bmatrix}, \begin{bmatrix} 0 & -1 & 0 \\ 0 & 2 & 0 \\ 0 & -1 & 0 \end{bmatrix}, \begin{bmatrix} 0 & 0 & 0 \\ -1 & 2 & -1 \\ 0 & 0 & 0 \end{bmatrix}, \begin{bmatrix} 0 & 0 & -1 \\ 0 & 2 & 0 \\ -1 & 0 & 0 \end{bmatrix}, \quad (12)$$

$$\begin{bmatrix} -1 & 0 & 0 \\ 0 & 2 & 0 \\ 0 & 0 & -1 \end{bmatrix}$$

The five transfer function $(A_E)$s expressed by the formula (12) are used for the blocks having no edge direction (monolithic), vertical, horizontal, 45° and 135°, direction, respectively.

The first, second, . . . , or S-th band pass filter 110, 112, . . . , or 114 may be realized in a frequency domain or a spacial domain. In order to remove the blocking artifacts at a high rate in real time, the impulse response of the transfer function $g_E$ expressed by the formula (10) is calculated by using an inverse Fourier transform, and the region of support of the filter is truncated by using a raised-cosine window, thereby realizing an FIR filter. Here, the "raised-cosine window" is an arbitrary portion ("window") of a cosine function which has been offset vertically ("raised").

The signal selector 116 selects one of the bandpass filtered image signals, corresponding to the edge direction detected by the comparator 106, and outputs to the signal synthesizer 118 the image signal of the corresponding block in response to the horizontal or vertical synchronous signal HS/VS.

The signal synthesizer 118 synthesizes the selected image signals, output from the signal selector 116, of all the blocks in response to a field synchronous signal (FDS) or a frame synchronous signal (FMS), and outputs the synthesized result via an output port OUT, as the original image from which the blocking artifacts have been removed. As a result, the blocking artifacts of the image by the degradation operator can be removed.

Thus, the image restoring portion 92 of FIG. 5 receives a moving image signal which has been block-based compressed/reproduced according to the H.261, H.263, MPEG1, MPEG2 or MPEG4 standard, or a still image signal which has been block-based compressed/reproduced according to the JPEG standard, and removes the blocking artifacts. Also, during a non-overlapping histogram equalization for expanding the contrast of the image, the quantization noise of the data compressed and restored based on the MPEG standard may be amplified by expanding contrast, so the image restoring portion 92 shown in FIG. 5 may be used instead of a low pass filter used for removing the amplified noise.

As described above, the block-based image processing method and the apparatus therefor according to the present invention can quickly, in real time, remove the blocking artifacts caused by the block-based image processing of a moving image as well as a still image.

What is claimed is:

1. A block-based image processing method for removing blocking artifacts induced in processing an image in blocks of a predetermined unit size, the method comprising the steps of:

(a) dividing the processed image signal into blocks of the predetermined unit size;

(b) detecting an edge direction of the image for each block divided;

(c) simultaneously band-pass filtering the processed image signal to obtain a plurality of filtered image signals equal in number to possible types of edge direction;

(d) selecting one of the band-pass filtered image signals for each block, according to the detected edge direction; and (e) synthesizing the selected image signals for all the blocks to obtain an original signal from which the blocking artifact is removed.

2. The method of claim 1, wherein the step (b) comprises the sub-steps of:

(b1) calculating at least two discrete cosine transform (DCT) coefficients for each block; and (b2) detecting the edge direction of the image in each block by using the two or more DCT coefficients.

3. The method of claim 1, wherein the step (b2) comprises the sub-steps of:

(b21) determining whether or not the absolute value of each of a first DCT coefficient $C_v$, representing a vertical edge direction, and a second DCT coefficient $C_h$, representing a horizontal edge direction, is less than a predetermined first threshold value;

(b22) determining that the image in each block has no edge direction if the absolute value of each of the first and second DCT coefficients $C_v$ and $C_h$ is less than the first predetermined threshold value;

(b23) determining whether or not the product of $C_v$ and $C_h$ is positive if $C_v$ or $C_h$ is greater than or equal to the first threshold value;

(b24) provisionally determining that the edge direction of the image in each block is a first predetermined angle, if the product of $C_v$ and $C_h$ is positive;

(b25) provisionally determining that the edge direction of the image in each block is a second predetermined angle, if the product of $C_v$ and $C_h$ is not positive;

(b26) determining whether or not the result of subtracting the absolute value of $C_v$ from the absolute value of $C_h$ is greater than a second predetermined threshold value, after the step (b24);

(b27) determining whether or not the result of subtracting the absolute value of $C_h$ from the absolute value of $C_v$ is greater than the second predetermined threshold value if the result of subtraction in the step (b26) is not greater than the second predetermined threshold value;

(b28) finally determining that the edge direction of the image in each block is the first predetermined angle, if the result of subtracting the absolute value of $C_h$ from the absolute value of $C_v$ is not greater than the second predetermined threshold value;

(b29) determining whether or not the result of subtracting the absolute value $C_v$ from the absolute value of $C_h$ is greater than the second predetermined threshold value, after the step (b25);

(b30) determining that the edge direction of the image in each block is a third predetermined angle, if the result of subtracting the absolute value of $C_v$ from the absolute value of $C_h$ is greater than the second predetermined threshold value in the step (b26) or (b29);

(b31) determining whether or not the result of subtracting the absolute value of $C_h$ from the absolute value of $C_v$ is greater than the second predetermined threshold value, if the result of subtraction in the step (b29) is not greater than the second predetermined threshold value;

(b32) determining that the edge direction of the image in each block is a fourth predetermined angle, if the result of subtracting the absolute value of $C_h$ from the absolute value of $C_v$ is greater than the second predetermined threshold value in the step (b31) or (b27); and (b33) finally determining that the edge direction of the image in each block is the second predetermined angle, if the result of subtracting the absolute value of $C_h$ from the absolute value of $C_v$ is not greater than the second predetermined threshold value in the step (b31).

4. The method of claim 3, wherein the first and second predetermined threshold values are the same as each other.

5. The method of claim 1, wherein the processed image signal is a signal reproduced from a moving image signal compressed based on blocks according to the MPEG1 standard.

6. The method of claim 1, wherein the processed image signal is a signal reproduced from a moving image signal compressed based on blocks according to the MPEG2 standard.

7. The method of claim 1, wherein the processed image signal is a signal reproduced from a still image signal compressed based on blocks according to the JPEG standard.

8. The method of claim 1, wherein the processed image signal is a luminance signal input to a low pass filter where the low pass filter is used for removing quantization noise amplified by contrast expansion of the data which has been compressed and restored by the MPEG standard when performing a non-overlapping histogram equalization for expanding the contrast.

9. A block-based image processing apparatus for removing blocking artifacts induced by processing an image in blocks of a predetermined unit size, comprising:

an edge direction detecting portion for detecting an edge direction of the processed image signal for each block;

first through S-th band pass filters for simultaneously filtering the processed image signal at S different predetermined bands and outputting the filtered results, wherein S is equal to the number of edge directions;

a signal selector for selecting at least one of outputs of the first through S-th band pass filters in response to the detected edge direction; and a signal synthesizer for synthesizing the selected at least one of outputs of the first through S-th band pass filters for all blocks, output from the signal selector, and outputting the synthesized signal as an original image signal from which the blocking artifacts are removed.

10. The apparatus of claim 9, wherein the edge direction detecting portion comprises:

an image divider for dividing the processed image signal into blocks of the predetermined unit size in response to a horizontal or vertical synchronous signal;

a DCT coefficient calculator for calculating at least two DCT coefficients for each block of the divided image; and a comparator for comparing the calculated two or more DCT coefficients with predetermined threshold values, and detecting the edge direction of the image for each block according to the results of the comparisons.

11. The apparatus of claim 9, wherein each of the first through S-th band pass filters is a finite impulse response (FIR) filter.

* * * * *